United States Patent [19]

Walls et al.

[11] 4,213,887

[45] Jul. 22, 1980

[54] LITHOGRAPHIC PLATE FINISHER

[75] Inventors: John E. Walls, Annandale; Thomas N. Gillich, Readington Township, Hunterdon County, both of N.J.

[73] Assignee: American Hoechst Corporation, Somerville, N.J.

[21] Appl. No.: 58,235

[22] Filed: Jul. 16, 1979

[51] Int. Cl.$^2$ .................... C08L 3/02; C08L 39/06
[52] U.S. Cl. .................. 260/29.6 E; 101/451; 101/452; 106/213
[58] Field of Search .......... 260/17.4 ST, 29.6 H, 260/29.6 E; 106/210, 213; 101/451, 452

[56] References Cited

U.S. PATENT DOCUMENTS

| | | | |
|---|---|---|---|
| 3,019,105 | 1/1962 | Adams | 260/17.4 ST |
| 3,525,704 | 8/1970 | Stimson | 260/17.4 ST |
| 3,644,332 | 2/1972 | Mooth | 106/213 |
| 3,759,850 | 9/1973 | Lehman | 260/17.4 ST |
| 3,770,471 | 11/1973 | Katsumi | 106/213 |
| 3,856,536 | 12/1974 | Siegelman | 260/29.6 E |
| 4,069,185 | 1/1978 | Sullivan | 260/29.6 E |
| 4,143,021 | 3/1979 | Garrett | 260/29.6 RW |
| 4,162,920 | 7/1979 | Gillich | 101/453 |

*Primary Examiner*—Paul R. Michl
*Attorney, Agent, or Firm*—Leo S. Burnett

[57] ABSTRACT

An aqueous nonblinding lithographic plate finisher suitable for machine operation is provided which comprises an essentially cold-water soluble dextrin or polyvinyl pyrrolidone as hydrophilic polymer with a nonionic surfactant or mixture thereof having a hydrophile-lipophile balance between about 12 and 18, a humectant and a salt.

12 Claims, No Drawings

LITHOGRAPHIC PLATE FINISHER

DESCRIPTION

TECHNICAL FIELD

This invention relates to improved finisher compositions for lithographic printing plates. Finishers are conventionally used to maintain the nonimage areas of a developed lithographic plate in a hydrophilic condition and to preserve the image area in a clean condition. The improved finisher of this invention preserves the plate prior to printing and is very rapidly removed so that with the mounting of the plate and start-up of the press, the image accepts ink promptly and the nonimage is very clean.

BACKGROUND OF PRIOR ART

The well-known lithographic printing plates depend for their success on the fact that image areas attrack ink and repel water (thus oleophilic) while nonimage areas repel ink and attract water (thus hydrophilic). This is true regardless of whether the plate is negative acting, i.e., the light-sensitive coating is hardened upon exposure to actinic light, so that the unaffected portions are removed by developer, or positive-acting, so that the light-sensitive coating is rendered soluble by exposure to actinic light and may be removed by developer.

It is desirable that the image area be highly oleophilic, so that after mounting a plate upon a press, the image areas accept ink from the ink rollers and transfer ink to the blanket and thence to paper in the fewest number of impressions. This capability is known as fast roll-up, and is an economic factor because of the loss due to wasted paper and machine time if the image only slowly accepts and transfers ink. This condition is known as blinding.

The nonimage area, as noted above, must be hydrophilic initially before the plate is mounted on the press and throughout the press run. An incompletely hydrophilic nonimage area will accept some ink and produce a greyed or ink-smudged background, a condition known as scumming.

To minimize either blinding or scumming, it is conventional to treat a freshly developed plate after water rinsing with a plate finisher which normally contains a hydrophilic colloid, a surfactant, salts and water. This action is called desensitization.

Gum arabic and synthetic gums have been used to finish lithographic printing plates. However, with these agents, gum blinding often occurs.

Improved finishers have been prepared and used which contain water, tapioca dextrin, an anionic surfactant, and as a humectant, glycerol. Sporadic blinding occurred despite the improvement; performance was not consistent. The tapioca dextrin used required prolonged heating to dissolve it.

Another improved finisher is described in U.S. Pat. No. 4,162,920, which finisher is additionally a preserver. This finisher uses tapioca dextrin as the hydrophilic colloid. Other ingredients are a mixture of anionic and nonionic surfactants, glycerol and a petroleum distillate to dissolve the nonaqueous surfactant. An emulsion is formed.

Despite freedom from blinding, as it is an emulsion, this finisher settles on standing and is not usable for machine processing.

U.S. Pat. No. 4,143,021 describes an aqueous finisher which uses a polyoxyalkylene glycol to eliminate tackiness of drying films on lithographic printing plates encountered in patentee's previous formulation. However, applicants have never encountered a tackiness problem in previous finishers.

It is an object of this invention to provide an aqueous composition that will desensitize the nonimage areas of a lithographic printing plate while simultaneously enhancing the receptivity to ink of the image areas with a minimum number of impressions on the press. It is another object of this invention to provide a composition of simplified manufacture, handling and storage. It is a further object to provide a composition which can be used in a processing machine as well as by hand, which can be readily removed with a water rinse or by contact with the dampening rollers of a lithographic press. It is also an object to provide all of the previously mentioned characteristics in a composition which is dependable and reliable in its performance.

BRIEF SUMMARY OF INVENTION

It has now been discovered that a finishing composition may be made which meets the aformentioned objects which comprises an aqueous solution of essentially cold water-soluble dextrin or polyvinylpyrrolidone as hydrophilic polymer with a nonionic surfactant or mixture thereof having a hydrophile-lipophile (HLB) balance between about 12 and 18, a polyethylene glycol as humectant, and an alkali phosphate.

DETAILED DESCRIPTION OF THE INVENTION

The most useful hydrophilic polymers for the plate finisher of this invention are starch dextrins and polyvinylpyrrolidone. Dextrins are prepared from naturally occurring starches such as potato, corn, and tapioca. These naturally occurring starches are subjected to heat treatment which alters them from their initially water-insoluble granular state to a water-soluble form, to a degree depending upon the conditions of the processing.

For the purpose of this invention, any dextrin is suitable provided it is substantially cold water-soluble. By substantially cold water-soluble, we mean a dextrin which when stirred into water at 22° C. in the proportions of 8 gr of dextrin to 92 gr of water for a period of fifteen minutes leaves an undissolved sediment or residue of not more than 5% of the dextrin. Dextrins which by this test are 98% or more soluble are preferred. Substantially cold water-soluble dextrins as herein-defined have the advantage that finishers incorporating them after application to a plate in a thin film and drying, can be readily redissolved in cold water either by rinsing separately, or upon application of the dampening rolls on a press.

Although all dextrins which meet the above requirement of a high degree of cold water-solubility are suitable, tapioca dextrins are preferred. In the total composition, dextrins may be employed from about 1.5% to about 10% on a weight basis to give satisfactory results. However, a range of from about 3% to about 5% on a weight basis is preferred.

As mentioned above, polyvinylpyrrolidone (PVP) is also suitable as a hydrophilic polymer for the purpose of this invention. Polyvinylpyrrolidone is available in various molecular weights. Broadly, PVP having a molecular weight of from about 3,000 to about 140,000 is suitable. However, materials having a molecular weight of between 8,000 and 100,000 are to be preferred. Less polyvinylpyrrolidone is required than if dextrins are employed. Broadly, an amount from about 0.1% to about 3% on a weight basis is effective, while an amount from between about 1% to about 2% is to be preferred.

A properly chosen surfactant will contribute desirable characteristics to the plate finisher. Although all components interact and should be tested in combination, it has been found that a satisfactory surfactant can contribute to a clean background, smooth film formation, low foaming, a high cloud point, quick release from the image, and possibly, even assist in enhancing the oleophilicity of the image. In addition, it will provide proper surface tension and, of course, be compatible with other ingredients, so as not to create separation. In addition, it will have no offensive or toxic effects.

Nonionic surfactants are, in general, the most satisfactory. The hydrophile-lipophile balance (HLB) concept is widely used to characterize individual surfactants numerically, based upon their relative balance of hydrophilic and oleophilic groups. The HLB concept is valuable in helping to select the proper surfactant from among the class of nonionics. Although performance tests of complete finisher compositions must be made, nevertheless the HLB is a valuable guide in selection of individual surfactants or their blends. Thus, we have found that at least one nonionic surfactant, having a hydrophile-lipophile balance of between about 12 and 18, may be used either for an individual such surfactant, or for a blend thereof, but preferably this range may be from about 13 to about 16. In the total composition, surfactant content may range from about 0.2% to about 7% on a weight basis, although preferably, it should lie between 0.25% and 3.5% on a weight basis.

Suitable nonionic surfactants include ethoxylated aliphatic fluorocarbons and ethoxylated vegetable oils, such as a polyoxyethylene vegetable oil. Ethoxylated aliphatic alcohols, are particularly suitable and include as examples tridecyl oxy polyoxyethylene ethanol, polyoxyethylene tridecyl ether (12 moles ethylene oxide), polyoxyethylene tridecyl ether (15 moles ethylene oxide), polyoxyethylene tridecyl ether (6 moles ethylene oxide), polyoxyethylene decyl ether (4 moles ethylene oxide), and polyoxyethylene fatty alcohol.

Also suitable are the class of ethoxylated aryl alcohols, examples of which include octyl phenoxy polyoxyethylene ethanol (40 moles ethylene oxide), nonyl phenoxy polyoxyethylene ethanol (15 moles ethylene oxide), nonyl phenoxy polyoxyethylene ethanol (4 moles ethylene oxide), nonyl phenoxy polyoxyethylene ethanol (1.5 moles ethylene oxide), nonyl phenoxy polyoxyethylene ethanol (5 moles ethylene oxide), octyl phenoxy polyoxyethylene ethanol (1 mole ethylene oxide), octyl phenoxy polyoxyethylene ethanol (5 moles ethylene oxide), octyl phenoxy polyoxyethylene ethanol (7 moles ethylene oxide), alkyl phenoxy polyoxyethylene ethanol, and isooctyl phenoxy polyoxyethylene ethanol (125 moles ethylene oxide). Also suitable is tetramethyl decynediol when used in blends, and sorbitol and sorbitan derivatives, which include polyoxyethylene sorbitol lanolin derivative, polyoxyethylene sorbitan monolaurate, polyoxyethylene sorbitan monopalmitate, polyoxyethylene sorbitan monostearate, polyethylene sorbitan monooleate, sorbitan monolaurate, sorbitan monopalmitate, sorbitan monostearate, sorbitan monooleate, and sorbitan trioleate.

The above-mentioned examples of surfactants are suitable when their HLB individually or in blend falls within the above-described ranges. Generally, surfactants with an HLB lower than 10.0 are not sufficiently water-soluble. HLB's slightly above 10 would be water-soluble, and aid in imparting oleophilicity to the image, but would result in ink having an affinity for the background. HLB's greater than 18 would render the background clean, but at the same time cause blinding.

Given two surfactants with a high and low extreme of HLB, a blend to the desired HLB may be made using the following formulas:
  (a) $100 \text{ (Desired HLB} - S_1)/(S_2 - S_1) = \% S_2$
  (b) $\% S_1 = 100 - \% S_2$
Where
  $S_1$ = HLB of low HLB surfactant
  $S_2$ = HLB of high HLB surfactant
Higher than binary mixtures may also be used and calculated on a similar basis.

Surface tension is important in the lithographic quality of the finisher. A nominal range of surface tension of between about 25 and about 40 dynes per square centimeter is desirable. Although nonionics as a class are satisfactory, as mentioned above, the ethoxylated linear alcohols are preferred with the ethoxylated aryl and alkaryl derivatives and various sorbitan derivatives also desirable and to be preferred in that order.

A humectant is an important and desirable component of the lithographic plate finisher of this invention. Humectants prevent desiccation of the finisher on the plate upon drying, and thus aid in ease of removal, either upon subsequent rinsing, or when the plate has been mounted on the press and the fountain solution dampening roll contacts the plate surface. The quick removal of the finisher film aids fast attraction of ink by the image, which is an economic factor.

Useful humectants are polyethylene glycols, polypropylene glycols, ethylene glycol and propylene glycol. Of these, the polyethylene glycols are somewhat to be preferred. An average molecular weight for the polyethylene glycol of less than about 800 is preferred.

Broadly, a humectant may be employed in an amount of about 0.3% to about 5% on a weight basis, although the range of from about 1% to about 3% is to be preferred.

Salts are added to regulate pH and to contribute to the hydrophilizing action on the background. Suitable salts include sodium nitrate, sodium sulfate, calcium nitrate, magnesium nitrate, magnesium sulfate, sodium phosphate, ammonium phosphate, ammonium nitrate, ammonium sulfate, sodium acetate, potassium tartrate, mono-, di- and trisodium phosphates and the corresponding potassium phosphates, and the like, as long as solutions of these salts do not corrode the plate. Of these, the various phosphate salts are preferred.

Salts may be added to the lithographic plate finisher in a range from about 0.05 to about 13% by weight. However, a narrower range of from about 0.1 to about 1.5% is preferable.

The pH may be further adjusted with acids, preferably the acid from which the salt is derived. The broadly desirable range of pH is from about 2.5 to about 9.5. Outside of this range, plates tend to blind. The preferred range of pH is from about 4.5 to about 8.

Although not essential to the effectiveness of a freshly made finisher, according to this invention, an antimicrobial agent or bacteriostat is desirable to aid in its preservation. Numerous phenols and phenol derivatives are available on the market for use as bacteriostats and fungistats. Compositions containing these at the level of a few tenths of a percent or even lower are sufficient for effective retardation of spoilage.

To test the components for suitability, a stock solution of the hydrophilic polymer, the surfactant and the humectant, is made up and subjected to standard and accelerated testing. For instance, to test surfactants, a stock solution is made up containing 91.95% of water, 8% of dextrin and 0.05% of trisodium phosphate. To this solution, sufficient 85% phosphoric acid is added to adjust the pH to 7.0. Various surfactants are then added to this stock solution.

Previously exposed and developed plates are hand coated with the experimental solutions, and then baked at 100° C. for 15 minutes. After the plate is cooled, it is dry inked with heavy rub-up ink. The ink is then water washed and the plate observed for lithographic properties. Similarly, the hydrophilic polymers are tested, first for cold water-solubility, and then by application as a film to a lithographic plate. Even after heating in an oven at 70° C. for 10 minutes, the film is readily removed from the image with a cold water washing. Complete finisher formulations must retain the oleophilicity of the image, so that a quick and total rollup is attained. At the same time, the background must be protected during storage prior to printing so as to retain total hydrophilicity. Upon rollup, the plate must have the ability to release ink that may have been applied through handling or because of ink that is present when the ink form rollers are dropped without adequate dampening.

Complete formulations are tested by various techniques. One is to store finished plates and observe the rollup. Accelerated tests are performed by baking at 70° C., 100° C. and 120° C. Other plates were stored in the refrigerator and at room temperature. All these plates are tested by:

1. Dry inking and rebaking the plate and rinsing.
2. Dry inking and rinsing immediately.
3. Rinsing the plate, dry and ink, then rinse again.
4. Rinse the plate and wet ink.

In all cases, after the test, the plate must have a clean background and a totally oleophilic image.

Diverse solutions of subtractive finisher for negative and positive working lithographic plates were prepared according to the formulations of the following examples.

The compositions of the present invention are particularly useful for lithographic printing plates having coatings which contain diazo salts and 1,2-diazo-naphthoquinone sulfoesters and polymers such as polyvinyl formal and novolak type phenolic resins. Typical plates which may be processed with the plate finishers of this invention are the ENCO ® N-100, N-200 and N-2 Negative-Acting plates and the ENCO ® PA-200 Series Positive-Acting plates, products of Azoplate, Division of American Hoechst Corporation. Also processable are the Polychrome DSN, and the "S" and "K" plates of the Minnesota Mining and Manufacturing Company. All these are subtractive plates. In addition to negative and positive working subtractive lithographic plates, tests were successfully conducted on wipe-on substrates, as detailed in Examples 11–15 below.

The efficiency of the finisher, in every case, was tested by several rigorous methods designed to accentuate any inherent weaknesses of the formulation. The final test was to place the treated plates on a printing press and run several thousand acceptable copies. Particular emphasis is placed upon the speed and totality of the image on roll-up.

One method was to process a developed plate with the solution to be tested, either by hand or machine. Half of the plate was dry inked with any conventional heavy rub-up ink and buffed to a thin film. The other half of the plate was untreated. The entire plate was baked at 100° C. for 15 minutes. After baking and upon the plate being cooled to room temperature, the side that was previously ink was wiped with a damp pad. The untreated side was inked with a damp pad. In both cases, an acceptable finisher would prevent any ink from adhering to the background while at the same time not preventing the image from being fully ink receptive.

An alternative method to accentuate potential problems with a test finisher was to enter finished plates into an aging test. Plates processed with the test finisher were entered into aging at 4.5° C. and 50° C. Samples were tested at 10 to 15 day intervals by inking the plate with a damp pad. As in the previously described test, the only acceptable results are those where the background has no affinity for ink and where the image is covered with ink quickly, totally and uniformly. This test was run for 143 days, then concluded.

The following examples are illustrative of the invention.

EXAMPLE 1

A subtractive finisher for positive and negative working plates was prepared with the following composition in percent by weight:

|  | % W/W |
| --- | --- |
| H₂O (Tap) | 88.07 |
| Tapioca dextrin | 6.00 |
| Surfactant A | 3.00 |
| Tetraethylene glycol | 2.00 |
| Monosodium phosphate | 0.33 |
| Trisodium phosphate | 0.40 |
| Antimicrobial agent A | 0.20 |

To prepare this finisher, 25% of the water was heated to 65° C. and the tapioca dextrin added with agitation. Stirring was continued for ten minutes after which heat was discontinued and the balance of the water was added. Without regard to the order of addition, the remainder of the ingredients were added.

Surfactant A is isooctyl phenoxy polyoxy ethylene ethanol (12.5 moles ethylene oxide). Antimicrobial agent A is 1-(3-Cl allyl)-3,5,7-triaza-1-azonia adamantane Cl.

The finisher, as formulated above, was applied to negative and positive working lithographic plates, and successfully subjected to the aging tests detailed above. All plates exhibited a totally clean background and an image that accepted ink immediately with no indication of blinding.

EXAMPLES 2 THROUGH 10

Using the procedure of Example 1, in like manner, for the purpose of ascertaining the influence of the proportions of hydrophilic film-forming resin, surfactant, humectant/plasticizer, and alkali metal phosphates in the formulation of subtractive finisher, diverse finishers were prepared within the following range of variations in formulation:

|  | % W/W |
| --- | --- |
| Hydrophilic film-forming resins | 1.5–8.0 |
| Surfactant | 1.0–3.0 |
| Humectant/Plasticizer | 1.0–3.0 |
| Alkali Metal Phosphate | 0.6–9.5 |
| Bacteriostat/fungistat | 0.1–0.2 |
| Water | Balance to total 100 |

Using the aforementioned constraints placed upon the percents by weight on each of the various ingredients, the following Table lists other formulations.

The surfactants listed in the Table have the following compositions:

| Surfactant | Composition (EO = Ethylene Oxide) |
| --- | --- |
| B | nonyl phenoxy polyoxyethylene ethanol (15 moles EO) |
| C | octyl phenoxy polyoxyethylene ethanol (9.5 moles EO) |
| D | polyoxyethylene tridecyl ether (12 moles EO) |
| E | polyoxyethylene tridecyl ether (15 moles EO) |
| G | sorbitan monolaurate |
| H | polyoxyethylene sorbitan monolaurate |
| I | polyoxyethylene decyl ether (6 moles EO) |

The humectants in the Table have the following compositions:

| Humectant | Composition (average molecular weight) |
| --- | --- |
| A | polyethylene glycol (200) |
| B | polyethylene glycol (400) |

Antimicrobial Agent B is 6 acetoxy-2,4-dimethyl-m-dioxane.

In like manner each of these solutions was tested on negative and positive working subtractive lithographic plates and subjected to the tests heretofore described. All plates exhibited a totally clean background and an image that accepted ink immediately with no indication of blinding.

(See Table)

EXAMPLES 11 THROUGH 15

Again in accordance with the same percentage constraints given in Examples 2–10 placed upon the various ingredients, the Table lists additional examples of formulations made with the procedure described in Example 1.

Surfactant F is polyoxyethylene sorbitan monopalmitate.

In addition to testing these solutions on negative and positive working subtractive lithographic plates, they were further tested on wipe-on substrates using conventional chemicals and techniques employed by those experienced in their use.

(See Table)

A typical wipe-on substrate (ex. Front Page ®, an anodized aluminum sheet supplied by Western Litho) was coated with a water soluble product of the condensation reaction of p-diazo diphenylamine sulfate and paraformaldehyde in sulfuric acid which is subsequently precipitated with zinc chloride. Upon drying the coating, the plate was exposed through a negative flat to actinic radiation. The plate was then developed with a lacquer developer (Black Diamond supplied by Western Litho), rinsed and dried.

Plates processed in this fashion were then finished with each of the five solutions and subjected to the tests previously described for the testing of subtractive plates.

In Examples 11 through 15 as well as in Examples 1 through 10, all plates exhibited a totally clean background and an image that accepted ink immediately with no indication of blinding.

EXAMPLE 16

A solution was made by dissolving 36 gr of gum arabic powder in 130 gr of water that had been heated to 65° C. The heat was discontinued after 10 minutes at which point 407.6 gr of water at room temperature was added. Without regard to the sequence of addition, the following was added: polyethylene glycol (average molecular weight 400) 12.0 gr, 0.6 gr trisodium phosphate and 0.6 gr of Antimicrobial Agent A, plus 12.0 gr of Surfactant C.

This finisher was applied to negative and positive working lithographic plates and tested in the same manner as all previous examples.

TABLE

| INGREDIENT | EXAMPLE | | | | | | | | | | | | | | |
| --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 | 13 | 14 | 15 |
| H₂O | 528.4 | 522.9 | 549.6 | 577.8 | 529.3 | 568.1 | 538.8 | 554.9 | 550.8 | 562.2 | 556.0 | 560.1 | 567.6 | 570.0 | 513.6 |
| Tapioca Dextrin | 36.0 | 48.0 | 36.0 | — | 36.0 | 15.0 | 27.0 | 27.0 | 18.0 | — | 18.0 | 18.0 | 12.0 | 15.0 | 48.0 |
| PVP | — | — | — | 9.0 | — | — | — | — | — | 18.0 | — | — | — | — | — |
| Surfactant A | 18.0 | — | — | — | — | — | — | 6.0 | — | — | — | — | — | — | — |
| Surfactant B | — | — | 6.0 | — | 12.0 | — | — | — | — | — | — | — | — | — | — |
| Surfactant C | — | — | — | 6.0 | — | — | — | — | — | — | 18.0 | — | — | — | — |
| Surfactant D | — | — | — | — | — | — | 18.0 | — | — | 12.0 | — | — | — | — | — |
| Surfactant E | — | 12.0 | — | — | — | — | — | — | — | — | — | 6.0 | — | — | — |
| Surfactant F | — | — | — | — | — | — | — | — | — | — | — | — | 12.0 | — | 18.0 |
| Surfactant G | — | — | — | — | — | — | — | — | 3.6 | — | — | — | — | 2.0 | — |
| Surfactant H | — | — | — | — | — | — | — | — | 14.4 | — | — | — | — | 4.0 | — |
| Surfactant I | — | — | — | — | 9.0 | — | — | — | — | — | — | — | — | — | — |
| Humectant A | — | 12.0 | — | 6.0 | — | — | 15.0 | — | — | — | 6.0 | — | — | — | — |
| Humectant B | — | — | — | — | 12.0 | — | — | — | — | — | — | — | — | 6.0 | — |
| Tetraethylene Glycol | 12.0 | — | — | — | — | — | — | 6.0 | — | — | — | — | — | — | 18.0 |
| Ethylene Glycol | — | — | 6.0 | — | — | — | — | — | 12.0 | — | — | — | 6.0 | — | — |
| Propylene Glycol | — | — | — | — | — | 6.0 | — | — | — | 6.0 | — | 12.0 | — | — | — |
| Phosphoric Acid (85%) | — | 0.3 | — | — | — | 0.1 | — | — | — | — | 0.2 | 0.3 | — | — | — |

TABLE-continued

| INGREDIENT | EXAMPLE | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Monosodium Phosphate | 2.0 | — | — | — | 6.5 | — | — | 2.5 | — | — | — | — | 0.6 | 1.2 | — |
| Trisodium Phosphate | 2.4 | 3.0 | 1.2 | 0.6 | 3.0 | 1.2 | 0.6 | 2.4 | 0.6 | 0.6 | 1.2 | 2.4 | 0.6 | 1.2 | 0.6 |
| Antimicrobial Agent A | 1.2 | — | — | 0.6 | 1.2 | — | — | — | 1.2 | 0.6 | — | 1.2 | — | — | 1.8 |
| Antimicrobial Agent B | — | 1.8 | 1.2 | — | — | 0.6 | 0.6 | — | — | 1.2 | 0.6 | — | 1.2 | 0.6 | — |
| ph | 7.5 | 7.0 | 7.6 | 6.7 | 5.3 | 6.5 | 6.7 | 7.1 | 6.6 (8.6/16.7) | 6.6 | 6.8 | 6.5 | 6.2 | 6.0 (8.6/16.7) | 6.6 |
| HLB | 14.6 | 15.4 | 15.0 | 13.5 | 15.0 | 13.0 | 14.5 | 14.6 | 15.0 | 14.5 | 13.5 | 15.4 | 15.6 | 14.0 | 15.6 |
| Surface Tension dynes/cm$^2$ | 34.1 | 34.7 | 34.5 | 34.3 | 34.0 | 35.2 | 32.8 | 34.5 | 35.5 | 32.9 | 33.9 | 34.9 | 33.0 | 35.7 | 32.8 |

The background with this solution was clean as desired but the image was irreversibly blinded so that no ink would adhere.

EXAMPLE 17

For further comparison, 24.0 gr of tapioca dextrin was dissolved in 130.0 gr of water that was heated to 65° C. Upon addition, stirring was continued for 10 minutes. The heat was removed and 425.9 gr of $H_2O$ at room temperature was added to the above. With no emphasis on the order of addition, the following were added: 12.0 gr of powdered sodium lauryl sulfate, 6.0 gr Humectant A, 1.2 gr trisodium phosphate, 0.3 gr phosphoric acid (85%) and 0.6 gr of 6 acetoxy-2,4-dimethyl-m-dioxane.

This finisher was tested on both positive and negative working lithographic plates in the fashion heretofore described. After functionally testing the plate, the background had a pronounced reduction of hydrophilic quality with a tendency for ink to adhere to the plate. The image was ink receptive, but required more force in inking than is desirable. This formulation was unacceptable lithographically.

EXAMPLE 18

In the same manner as detailed in prior examples, 36.0 gr of tapioca dextrin was dissolved in 130.0 gr of water heated to 65° C. Mixing was continued for 10 minutes. 419.6 gr of water at room temperature was added to the above. The following was then added: 12.0 gr polyoxyethylene decyl ether (6 moles ethylene oxide), 1.2 gr antimicrobial agent B, 0.6 gr trisodium phosphate and 0.6 gr monosodium phosphate.

When tested on both positive and negative working plates, this solution which had no humectant/plasticizer provided a very clean background. However, it was difficult to remove the film that was present from the image. Consequently, the image was not readily ink receptive and required much effort in order to make it acceptable.

EXAMPLE 19

Polyvinyl alcohol was used as the film former instead of tapioca dextrin. This resin is approximately 85% hydrolyzed, the remainder is acetate. 6.0 gr of this resin was dissolved in 145 gr of water heated to 65° C. After 10 minutes of stirring, heating was discontinued. 440.2 gr of water at room temperature was added to the above. The following was then added: 6.0 gr of an alkyl aryl polyoxyethylene ethanol surfactant (HLB=13.5), 6.0 gr polyethylene glycol (m.w. 200), 0.6 gr monosodium phosphate, 1.2 gr of trisodium phosphate, and 0.6 gr of preservative.

When tested on both positive and negative plates as described in Example 1, this solution containing polyvinyl alcohol as the film forming resin provided a clean background. However, the image was irreversibly blinded as it could not be made to accept ink.

EXAMPLE 20

In like manner, 12.0 gr of the previously described polyvinyl alcohol was added to 143.7 gr of water heated to 65° C. After 10 minutes of stirring, heating was discontinued. 430.5 gr of water at room temperature was added to the above. The following ingredients were then added: 6.0 gr of a sodium octyl sulfate surfactant (anionic), 6.0 gr of polyethylene glycol (m.w. 200), 0.6 gr of monosodium phosphate, 0.6 gr of trisodium phosphate, and 0.6 gr of preservative.

This solution containing an anionic surfactant and polyvinyl alcohol was tested on both negative and positive plates as described in Example 1. The results showed an image that was partially blinded as well as a background that was slightly toned as a result of partial loss of hydrophilicity.

EXAMPLE 21

In like manner, 18.0 gr of an essentially cold water-soluble tapioca dextrin was added to 142.0 gr of water heated to 65° C. After 10 minutes of stirring, heating was discontinued. 426.8 gr of water at room temperature was added to the above. The following ingredients were then added: 6.0 gr of a surfactant described as the dioctyl ester of sodium sulfosuccinic acid (anionic), 6.0 gr of propylene glycol, 0.6 gr of trisodium phosphate, and 0.6 gr of preservative.

When tested on both positive and negative plates as described in Example 1, this solution containing an anionic surfactant provided an image with a partial image loss of oleophilicity in addition to a background that had become slightly ink receptive.

EXAMPLE 22

In like manner, 36.0 gr of an essentially cold water-soluble tapioca dextrin was added to 135.0 gr of water heated to 65° C. After 10 minutes of stirring, heating was discontinued. 404.2 gr of water at room temperature was added to the above. The following ingredients were then added: 12.0 gr of a surfactant described as an ethanolated alkyl guanidine amine complex (cationic), 1.2 gr of trisodium phosphate, 12.0 gr of propylene glycol, and 0.6 gr of preservative.

When tested on both positive and negative plates as described in the preferred embodiment, this solution containing a cationic surfactant resulted in an image that was acceptably ink receptive but the background was severely scummed. No subsequent treatment would remove the ink.

EXAMPLE 23

In like manner, 18.0 gr of an essentially cold water-soluble tapioca dextrin was dissolved in 143.0 gr of water heated to 65° C. After 10 minutes of stirring, heating was discontinued. 425 gr of water at room temperature was added to the above. The folllowing ingredients were then added: 6.0 gr of a nonionic surfactant described as an ethoxylated sorbitan monolaurate, HLB=16.7, 6.0 gr of sorbitol, 0.6 gr of trisodium phosphate, and 0.6 gr of preservative. When tested on both positive and negative plates as described in the preferred embodiment, this solution containing sorbitol as the humectant/plasticizer resulted in blinding of the image.

EXAMPLE 24

In like manner, 36.0 gr of an essentially cold water-soluble tapioca dextrin was dissolved in 135.0 gr of water heated to 65° C. After 10 minutes of stirring, heating was discontinued. 405.6 gr of water at room temperature was added to the above. The following was then added: 12.0 gr of a nonionic surfactant described as octyl phenoxy polyoxyethylene ethanol, HLB=13.5, 9.0 gr of glycerol, 0.6 gr of monosodium phosphate, 1.2 gr of trisodium phosphate, and 0.6 gr of preservative.

When tested on both positive and negative plates as described in the preferred embodiment, this solution containing glycerol as the humectant/plasticizer resulted in a clean background but caused irreversible blinding of the image.

EXAMPLE 25

In like manner, 18.0 gr of a tapioca dextrin which is relatively insoluble in cold water was dissolved in 142.0 gr of water heated to 65° C. After stirring for 20 minutes, heating was discontinued. 426.8 gr of water at room temperature was added to the above. The following ingredients were then added: 6.0 gr of a nonionic surfactant described as polyoxyethylene tridecyl ether, HLB=15.4, 6.0 gr of polyethylene glycol (m.w. 200), 0.6 gr trisodium phosphate and 0.6 of preservative.

When tested on positive and negative plates as described in the preferred embodiment, this solution which contains relatively cold water-insoluble tapioca dextrin, resulted in a film that could not be totally removed from the image. The plate was therefore unacceptable because of blinding.

EXAMPLES 26 AND 27

Cold water-soluble corn and potato dextrins were used respectively in the following recipe:
Dextrin: 27.0 gr
Surfactant D: 12.0 gr
Polyethylene glycol (m.w. 200): 15.0 gr
Trisodium phosphate: 0.6 gr
Preservative: 0.6 gr
Water: 538.2 gr The dextrin was dissolved in 25% of the water with stirring at 65° C. for 10 minutes. The remaining ingredients were added with further stirring to form a clear homogenous solution.

The corn and potato dextrin finishers were then used on both negative and positive working plates and tested as in Example 1. In both cases, the background was completely hydrophilic. However, the image was somewhat slower to accept ink than when cold water-soluble tapioca dextrin was used, with the corn dextrin recipe somewhat better than the potato dextrin recipe. Both were considered acceptable.

What we claim is:

1. An aqueous lithographic plate finisher comprising
   a. an hydrophilic polymer selected from the group consisting of a substantially cold water-soluble dextrin and polyvinyl pyrrolidone,
   b. at least one nonionic surfactant having an hydrophile-lipophile balance of between about 12 and 18 either for an individual such surfactant or a blend thereof,
   c. a humectant,
   d. an inorganic salt, and
   e. water.

2. The plate finisher of claim 1, wherein the dextrin is tapioca dextrin.

3. The plate finisher of claim 1, wherein the polyvinyl pyrrolidone has an average molecular weight between about 5,000 and 100,000.

4. The plate finisher of claim 1, wherein the surfactant is an ethoxylated hydroxy compound having the formula R—(OCH$_2$ CH$_2$)n—R' where R is alkyl aryl or linear aliphatic, R' is ethanol and n=1 to 100.

5. The plate finisher of claim 1, wherein the surfactant is a blend of sorbitan esters and ethoxylated sorbitan esters.

6. The plate finisher of claim 2, wherein the surfactant is an ethoxylated linear alcohol having the formula R—(OCH$_2$ CH$_2$)n—R', where R is linear aliphatic and R' is ethanol.

7. The plate finisher of claim 1, wherein the humectant is selected from the group consisting of polyethylene glycols, polypropylene glycols, ethylene glycol and propylene glycol.

8. The plate finisher of claim 6, wherein the humectant is a polyethylene glycol having an average molecular weight not exceeding about 800.

9. A plate finisher according to claim 8, wherein the salt is an alkali phosphate.

10. A plate finisher according to claim 9, wherein the pH is between 2.5 and 9.5.

11. A process for finishing a developed lithographic printing plate comprising
    a. applying an aqueous finisher to the surface of said plate comprising an hydrophilic polymer selected from the group consisting of a substantially cold water-soluble dextrin and polyvinyl pyrrolidone, at least one nonionic surfactant having an hydrophile-lipophile balance of between about 12 and 18 either for an individual such surfactant or a blend thereof, a humectant, an inorganic salt, and water,
    b. distributing said finisher uniformly over the surface of said plate, and
    c. drying said finisher to a thin film.

12. A process of claim 11 wherein the hydrophilic polymer is a substantially cold water-soluble tapioca dextrin, the surfactant is an ethoxylated linear alcohol having the formula R—(OCH$_2$CH$_2$)n—R' where R is linear aliphatic and R' is ethanol, the humectant is a polyethylene glycol having an average molecular weight not exceeding about 800, and the inorganic salt is an alkali phosphate.

* * * * *